Figure 1:
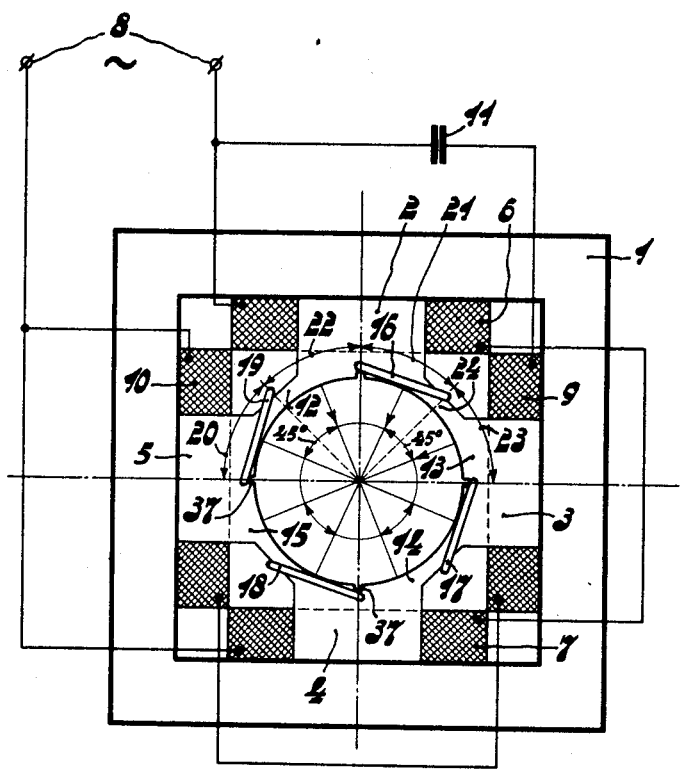

Feb. 14, 1956  B. M. MEIJER  2,735,056
CAPACITOR MOTOR

Filed July 5, 1952  2 Sheets-Sheet 1

INVENTOR
BAREND MARTINUS MEIJER
BY Fred M Vogel
AGENT

Feb. 14, 1956  B. M. MEIJER  2,735,056
CAPACITOR MOTOR
Filed July 5, 1952  2 Sheets-Sheet 2

INVENTOR
BAREND MARTINUS MEIJER
BY
AGENT

United States Patent Office 2,735,056
Patented Feb. 14, 1956

2,735,056
CAPACITOR MOTOR

Barend Martinus Meijer, Eindhoven, Netherlands, assignor to Hartford National Bank and Trust Company, Hartford, Conn., as trustee Application July 5, 1952, Serial No. 297,348

Claims priority, application Netherlands July 23, 1951

3 Claims. (Cl. 318—220)

This invention relates to capacitor motors having a small output power, for example a maximum corresponding to 100 watts, and including a stator which comprises at least four salient poles each of which is provided with a field coil, the field coils of two opposite poles being in series with the capacitor and each pole being surrounded by a short-circuited winding for part of the pole width. A motor of this type is described, for example, in U. S. specification No. 2,388,884. Although this specification states that the essential rotary field is obtained by adapting the design outlined this has been found to be insufficient for many uses. When driving talking machines, magnetic recorders or the like it has been found that, inter alia in the case of load variations, the drive is far from constant and this results in inaccuracies of sound reproduction. In addition, the vibration or shaking of the motor, which results from departures from a true rotary field, is undesirably manifest in sound reproduction.

According to the invention, an appreciable improvement in this respect is obtained by providing the poles with pole shoes which jointly constitute a continuous iron circuit and by distributing the short-circuited windings about the total pole circumference and at equal distances, the active part of each pole that is screened by a short-circuited winding being equally as long as each of the other parts. It goes without saying that the air-gap between stator and rotor (for example a squirrel-cage armature) should be constant.

We thus achieve a more truly circular rotary field, the flux from each separate pole part being equally out of phase with the next following pole part and each flux temporarily being of substantially equal intensity, so that it is possible to approximtae to a sinusoidal variation of the total flux.

According to a further aspect of the invention, in order to obtain a further improvement in accordance with the object aimed at by the invention, each pole is provided with two short-circuited windings the smaller of which has a larger copper section than the other and covers a third of the polar region, whereas the larger winding comprises two thirds of the polar region. Due to the larger copper section of the smaller winding a greater phase-shift of the field is ensured thereby and this results in an improved spatial distribution of the fields.

Still more favorable results may be obtained by proportioning the field coils in the capacitor branch differently from the coils in the other branch so that the maximum field strengths in the air-gaps opposite the various salient poles are as far as possible identical. This may be obtained by making the number of turns in the capacitor branch lower than the number of turns in the other branch (for example 3,200 as against 3,700) and making, if desired, the wire diameter in the first branch larger than that in the other branch.

The rotor may be constituted by a squirrel-cage armature or in some cases by a hysteresis rotor.

Figure 2:
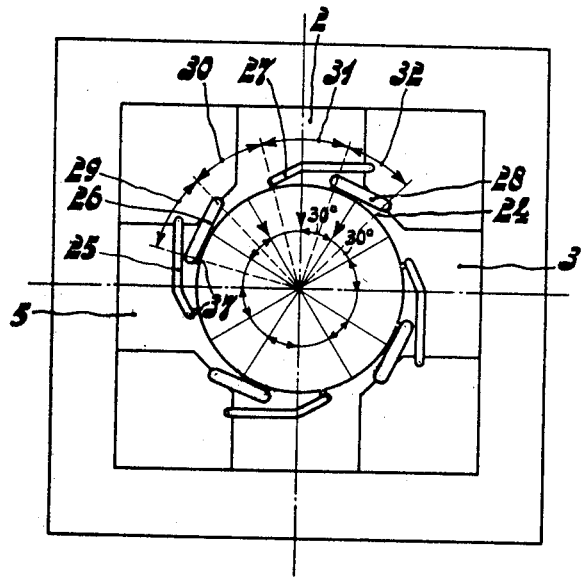
Figure 3:
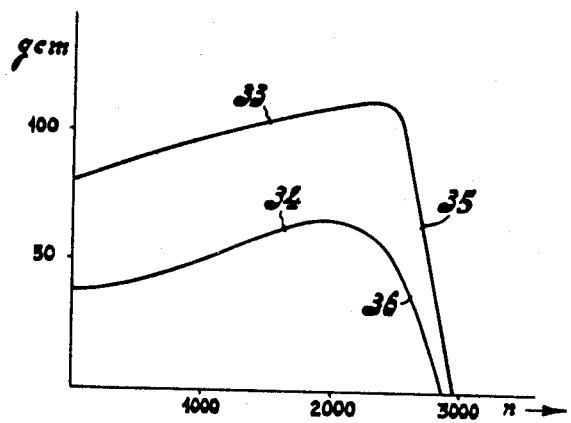

In order that the invention may be more clearly understood and readily carried into effect, it will now be described with reference to the accompanying drawings, in which Figs. 1 and 2 diagrammatically show, by way of example, two stators for motors according to the invention, whilst Figure 3 is an explanatory graph.

Referring to Fig. 1, a stator 1 comprises four salient poles 2 to 5, field coils 6, 7, of poles 2 and 4 being connected directly to an alternating-current voltage source 8 and field coils 9, 10 of poles 3 and 5 being connected thereto via a capacitor 11. Each pole has a pole shoe 12 to 15 respectively, all the pole shoes being magnetically interconnected. In addition, each pole comprises a short-circuited winding 16 to 19 respectively, the short-circuited windings being evenly distributed about the total pole circumference and the active part such as 20 or 21 of each pole that is screened by a short-circuited winding being equally as long as each of the other parts such as 22 and 23 respectively, that is to say the centre of the flux from a non-screened pole-portion and that from a screened portion are located at equal distances at intervals of 45° as clearly shown in the drawing. One of the conditions for a circular rotary field, that is to say that the poles should be spatially arranged at equal angles from each other is thus satisfied.

If at a given instant a field is available in the part 22, the field within the part 21 will lag in phase with respect thereto. The larger the copper section of the short-circuited winding 16 (and 17 to 19 respectively) the larger will be this phase angle. In this manner the desired relative phase angle of 45° can be approximated fairly well but, on the other hand, the intensity of the phase-shifted field within the part 21 decreases according as the copper section of the winding 16 increases. However, this loss may be substantially made up by replenishment from the field within the part 23, since the pole shoes 13 and 12 are magnetically coupled together by a magnetic bridge 24 of suitably chosen cross-section. Due to the supply from the capacitor 11 the field within the part 23 is 90° out of phase with the field within the part 22 so that the field passing through the part 23 is again 45° out of phase with the field passing through the part 21.

Continuing round the stator in this manner an optimum circular rotary field can be obtained, the condition being satisfied that at any given instant the field curve should approximate as far as possible to the sinusoidal form.

The effect can be further improved by providing two short-circuited windings per pole instead of one. This is shown in Fig. 2, where short-circuited windings 25, 26 and 27, 28 are arranged on the poles 5 and 2 respectively, the other poles being provided in a corresponding manner. The centres of the flux from each following pole are at an angle of 30° with one another and the part widths 29, 30, 31 and 32 are identical, 31 designating the active part of the pole that is enclosed solely by the short-circuited winding 27.

The flux passing through the part 31 will be displaced by the wide short-circuited winding 27, which embraces two thirds of the pole core, so as to be about 30° out of phase with the flux passing through the part 30. The flux passing through the part 32 will be out of phase with the flux passing through the part 31 but with windings 27, 28 of similar copper-section it may not be possible to approximate to a sufficient extent to the desired value of 30°. For this reason the copper section of the winding 28 is made considerably larger than that of the winding 27. As a result, the field passing through the part 32 and the winding 28 will be excessively attenuated but this loss is replenished from the field passing through the contiguous pole via the bridge 24.

The slots 37 in the pole shoes which serve to define the limits of the various successive poles have a small width (about 0.8 mm. was found suitable in an experimental model) in order that the rotary field may not be adversely affected. The slots in which the short-circuited windings are arranged are necessarily larger because of the cross-section of the windings and may be, say, 2 mms. for windings 25, 27 etc., and, say, 3 mms. for 26, 28 etc. The lowest thickness of the bridges 24 may be about 1.4 mm.

Fig. 3 shows the torque-speed characteristic curve 33 of an experimental model of a motor having the stator shown in Fig. 2 and constructed for an input power of 6 watts in comparison with the corresponding characteristic curve 34 of a normal capacitor motor (without short-circuited windings) having an input power of 9 watts. The operating range is located on the branches 35 and 36 of the waves. It is seen that the torque developed by the smaller motor according to the invention is located at a substantially higher level than that of the known capacitor motor and a similar finding applies to the efficiency. In addition, with a variable load it is seen that a much lower variation in speed occurs on the branch 35 than on the branch 36 which is much less steep. If the load increases to the extent of exceeding the top of the curve, the motors stop.

What I claim is:

1. A capacitor motor comprising a stator having at least four salient poles, each of said poles being provided with a field coil, the coils of two opposite poles being in series with the capacitor, at least one short-circuited winding surrounding a part of each of said poles, a magnetic bridge having a thickness of not less than 1.4 mm. for magnetically coupling at least two adjacent poles, each of said poles being provided with pole shoes which jointly form a continuous iron circuit, the short-circuited windings being distributed about the total pole circumference at equal distances and the active part of each pole that is screened by a short-circuited winding being equal in length.

2. A capacitor motor as claimed in claim 1 wherein each pole is provided with two short-circuited windings the smaller winding of which is provided with a larger copper section than the other winding, said smaller winding covering ⅓ of the polar region while the larger winding comprises ⅔ of the polar region, and the active part of one of said poles being enclosed solely by one of said short-circuited windings.

3. A capacitor motor as claimed in claim 1 wherein said field coils in the capacitor branch are proportioned differently from the coils in the other branch so that the maximum field strengths in the air gaps opposite the various salient poles are substantially identical.

References Cited in the file of this patent

UNITED STATES PATENTS

| | | |
|---|---|---|
| 1,822,679 | Stewart et al. | Sept. 8, 1931 |
| 1,916,909 | Stewart | July 4, 1933 |
| 1,922,216 | Persons | Aug. 15, 1933 |
| 1,983,091 | Larsh | Dec. 4, 1934 |
| 1,992,971 | Stewart | Mar. 5, 1935 |
| 2,388,884 | Thompson | Nov. 13, 1945 |
| 2,454,589 | Ballentine | Nov. 23, 1948 |
| 2,467,755 | Koch | Apr. 19, 1949 |
| 2,606,223 | Burian | Aug. 5, 1952 |

FOREIGN PATENTS

| | | |
|---|---|---|
| 625,506 | Great Britain | June 29, 1949 |
| 654,512 | Germany | Jan. 5, 1938 |